Feb. 13, 1945. T. W. FERRIES 2,369,120
COMBINED DRILL AND REAMER
Filed Aug. 18, 1943
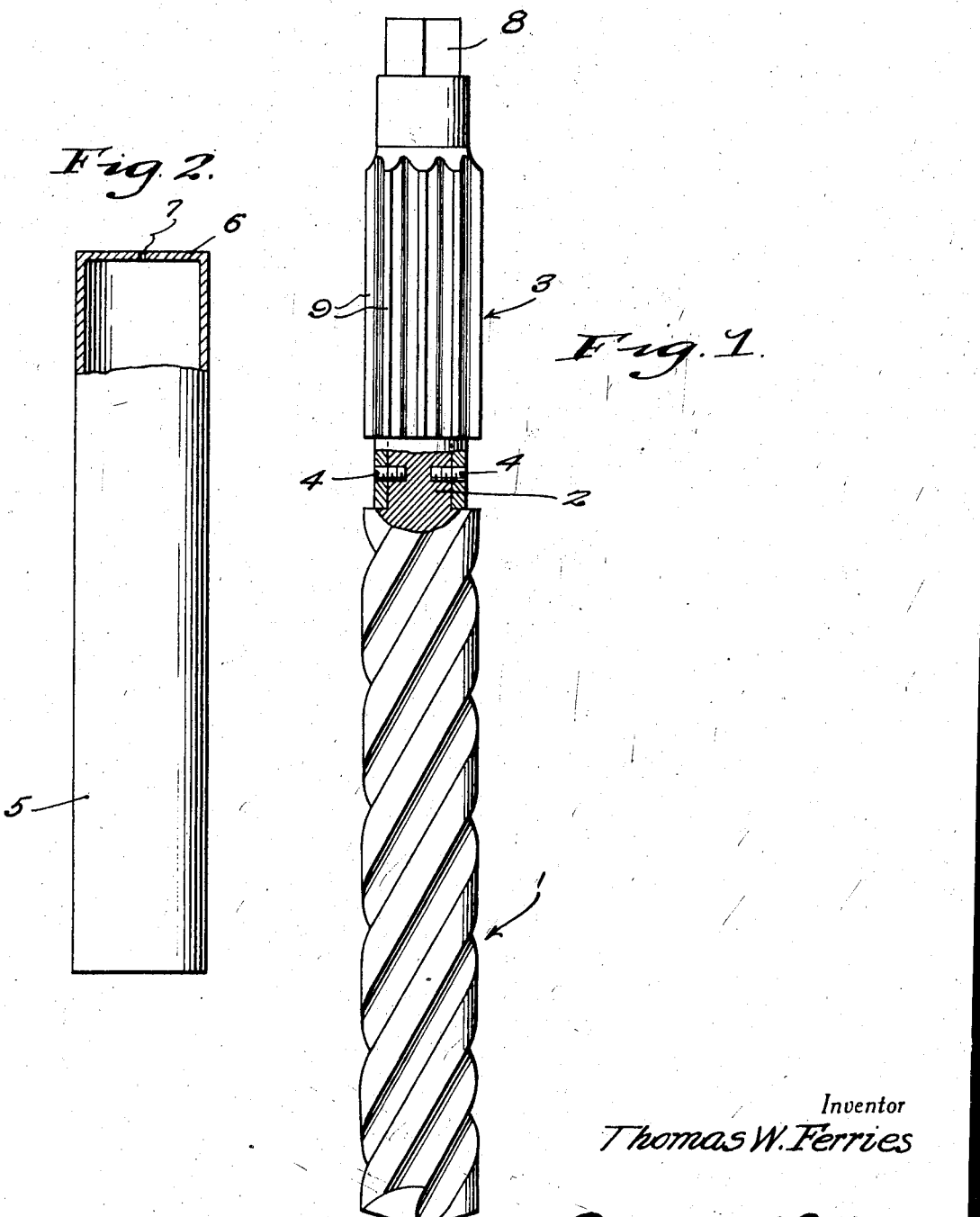
Inventor
Thomas W. Ferries
By Clarence A. O'Brien
and Harvey B. Jacobson, Attorneys

UNITED STATES PATENT OFFICE 2,369,120

COMBINED DRILL AND REAMER

Thomas W. Ferries, Los Angeles, Calif.

Application August 18, 1943, Serial No. 499,137

2 Claims. (Cl. 77—65)

The present invention relates to new and useful improvements in combination drills and reamers, and has for its primary object to provide, in a manner as hereinafter set forth, means whereby the two operations may be expeditiously performed without the necessity of withdrawing the tool from the work.

Another very important object of the invention is to provide a combination tool of the aforementioned character comprising novel means for assembling and detachably securing the drill and the reamer together.

Still another very important object of the invention is to provide unique means for facilitating the sharpening of the tool.

Other objects of the invention are to provide a combination drill and reamer which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawing, wherein like characters of reference designate corresponding parts throughout the several views, and wherein:

Figure 1 is an elevational view of a combination drill and reamer constructed in accordance with the present invention, an intermediate portion of the tool being broken away in section.

Figure 2 is a view principally in elevation of the sleeve which is used to facilitate sharpening the reamer in a machine, one end portion of said sleeve being broken away in section.

Referring now to the drawing in detail, it will be seen that the embodiment of the invention which has been illustrated comprises a twist drill 1 which may be of any suitable size and metal. The drill 1 has formed integrally therewith on one end a longitudinally projecting shank 2.

Removably mounted on the shank 2 is a reamer 3. The reamer 3 has extending thereinto from one end thereof a socket or bore which accommodates the shank 2. Screws 4 removably secure the reamer 3 on the shank 2.

It is thought that the operation of the tool will be readily apparent from a consideration of the foregoing. Of course, the drill 1 forms the hole and the reamer 3 follows said drill into the work for smoothing or dressing the hole. The construction and arrangement is such that a strong, rigid connection is had between the drill 1 and the reamer 3. However, the two members may be expeditiously taken apart for any reason by simply removing the screws 4 and slipping the reamer 3 off the shank 2.

To facilitate sharpening the reamer 3 in a lathe or other machine tool, a sleeve 5 is provided to be slipped on the drill 1. The sleeve 5 includes a closed end 6 having an opening 7 therein for the reception of a center. The shank 8 of the reamer 3 is then secured in the usual chuck of the machine and the blades 9 of said reamer may now be conveniently sharpened.

It is believed that the many advantages of a combination drill and reamer constructed in accordance with the present invention will be readily understood, and although a preferred embodiment of the device is as illustrated and described, it is to be understood that changes in the details of construction may be resorted to which will fall within the scope of the invention as claimed.

What is claimed is:

1. A tool for drilling a hole in metal and reaming the hole in one operation, comprising a metal drill having a reduced inner end portion forming a short axial shank, a metal reamer provided with a reduced driving shank at its inner end and having a reduced outer end formed with an axial socket in which the drill shank is snugly fitted, said reamer being of a size to dress a hole formed by said drill without materially increasing its diameter, and means detachably securing the drill shank in the reamer socket so as to provide a separable driving connection between the reamer and the drill.

2. In combination with a tool for drilling a hole and reaming the hole in one operation, and comprising a reamer having a driving shank at its inner end and a co-axial metal drill at its outer end, a sleeve adapted to snugly fit over the drill and having an outer end wall arranged to abut the outer end of the drill and provided with a small central opening for reception of the pointed end of a centering spindle of a lathe, whereby the tool may be mounted in the lathe for sharpening the reamer when the shank of the reamer is engaged in the lathe chuck.

THOMAS W. FERRIES.